United States Patent [19]

Gotoh et al.

[11] Patent Number: 5,075,381
[45] Date of Patent: Dec. 24, 1991

[54] THERMOPLASTIC RESIN COMPOSITION

[75] Inventors: Shiroh Gotoh; Yoshiaki Kawase, both of Yokkaichi, Japan

[73] Assignee: Mitsubishi Petrochemical Company Limited, Tokyo, Japan

[21] Appl. No.: 600,205

[22] Filed: Oct. 17, 1990

[30] Foreign Application Priority Data

Oct. 21, 1989 [JP] Japan ................................. 1-274623

[51] Int. Cl.$^5$ ....................... C08L 81/00; C08L 53/02
[52] U.S. Cl. ..................................... 525/189; 525/88; 525/92
[58] Field of Search ............................ 525/189, 92, 88

[56] References Cited

U.S. PATENT DOCUMENTS

| | | | |
|---|---|---|---|
| 4,436,865 | 3/1984 | Beever | 525/92 |
| 4,476,284 | 10/1984 | Cleary | 525/92 |
| 4,731,390 | 3/1988 | Mizuno | 525/189 |

*Primary Examiner*—Paul R. Michl
*Assistant Examiner*—Peter Szekely
*Attorney, Agent, or Firm*—Emmanuel J. Lobato; Robert E. Burns

[57] ABSTRACT

Disclosed is a thermoplastic resin composition formed by melt-kneading at a temperature of 300° to 340° C. a composition comprising (a) 10 to 95% by weight of a polyphenylene sulfide resin; (b) 90 to 5% by weight of a crystalline resin composed mainly of 3-methyl-1-butene, each of the amount of the components (a) and (b) being based on the sum of the components (a) and (b); (c) 5 to 20 parts by weight per 100 parts by weight of the sum of the components (a) and (b) of a partially hydrogenated alkenyl aromatic compound-conjugated diene copolymer; and (d) up to 150 parts by weight per 100 parts by weight of the sum of the components (a) and (b) of a fibrous filler. In this composition, the poor moldability of the polyphenylene sulfide resin is improved and the poor rigidity at a high temperature of the 3-methyl-1-butene polymer is improved, and excellent heat resistance, chemical resistance and mechanical strength inherently possessed by both the resins are retained.

12 Claims, No Drawings

THERMOPLASTIC RESIN COMPOSITION

BACKGROUND OF THE INVENTION

1. Field of the Art

The present invention relates to a thermoplastic resin composition having excellent mechanical strength, heat resistance, solvent resistance and appearance. More particularly, the present invention relates to a thermoplastic resin composition having such properties, which is suitably used for the production of industrial parts.

More specifically, the present invention relates to a thermoplastic resin composition obtained by melt-kneading a polyphenylene sulfide resin with a 3-methyl-1-butene polymer, which has excellent mechanical strength, heat resistance and chemical resistance of the polyphenylene sulfide and excellent moldability, heat resistance, chemical resistance and light weight of the 3-methyl-1-butene polymer in combination and provides a molded article having an excellent appearance.

2. Description of the Related Art

It is known that a polyphenylene sulfide resin is a material having excellent heat resistance, chemical resistance and mechanical strength, but this resin is defective in that the moldability is generally poor and the appearance of a molded article prepared from this resin is not good. Furthermore, since the resin is expensive, application fields are restricted.

In contrast, a 3-methyl-1-butene polymer has a light weight and excellent heat resistance, chemical resistance and moldability, but this polymer is not satisfactory in the rigidity at high temperatures.

Japanese Unexamined Patent Publication No. 62-131046 discloses an invention on a composition formed by incorporating an inorganic or organic flame retardant and polyphenylene sulfide or polyphenylene oxide in a 3-methyl-1-butene polymer. However, this prior invention does not appear to have been intended to solve the problem of the poor moldability or bad appearance of the molded article, and in fact, no practical solution therefor is given. Furthermore, a technique of improving the physical properties, other than the flame retardancy, of a 3-methyl-1-butene polymer, especially the rigidity at a high temperature and normal temperature, is not known.

SUMMARY OF THE INVENTION

We examined blending of a polyphenylene sulfide resin with a high-molecular-weight polypropylene resin or a poly-4-methyl-1-pentene resin with a view, to improving the moldability and other properties of the polyphenylene sulfide resin. However, in these blends, the heat resistance, the most characteristic feature of the polyphenylene sulfide resin, is drastically degraded, and these blends are not preferable. We therefore widened our investigation and, as the result, it was found that by using a crystalline resin composed mainly- of 3-methyl-1-pentene having a much higher heat resistance than that of polypropylene or the like, a composition having an excellent moldability and a good appearance can be obtained without substantial degradation of excellent performances of the polyphenylene sulfide resin. Furthermore, it was found that by incorporating polyphenylene sulfide into poly-3-methyl-1-butene, the rigidity of poly-3-methyl-1-butene is unexpectedly improved not only at high temperatures but also at normal temperatures. Still further, it was found that by incorporating a specific thermoplastic polymer [component (c)] to the above blend and melt kneading the composition under specific melt-molding conditions, a composition having excellent mechanical properties, heat resistance and chemical resistance can be obtained. We have now completed the present invention based on these findings.

More specifically, in accordance with the present invention, there is provided a thermoplastic resin composition formed by melt-kneading at a temperature of 300° to 340° C. a composition comprising (a) 10 to 95% by weight of a polyphenylene sulfide resin; (b) 90 to 5% by weight of a crystalline resin composed mainly of 3-methyl-1-butene, each of the amount of the components (a) and (b) being based on the sum of the components (a) and (b); (c) 5 to 20 parts by weight per 100 parts by weight of the sum of the components (a) and (b) of a partially hydrogenated alkenyl aromatic compound-conjugated diene copolymer; and (d) 0 to 150 parts by weight per 100 parts by weight of the sum of the components (a) and (b) of a fibrous filler.

The thermoplastic resin composition of the present invention has excellent mechanical properties, especially high rigidity at a high temperature, high impact resistance, high heat resistance and high chemical resistance, inherently possessed by the polyphenylene sulfide resin and 3-methyl-1-butene polymer, and the problem of a poor moldability of the polyphenylene sulfide resin can be solved in the thermoplastic resin composition of the present invention.

Accordingly, the resin composition of the present invention is valuable as a resin for the production of various molded bodies for which high performances are required.

DETAILED DESCRIPTION OF THE PREFERRED EMBODIMENTS

[I] Components of composition

The constituent components of the thermoplastic resin composition of the present invention will now be described.

(1) Polyphenylene sulfide resin [component (a)]

The polyphenylene sulfide resin [component (a)] used in the present invention is a crystalline resin comprising recurring units represented by the formula of

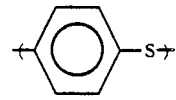

as the main recurring units.

In the present invention, a crystalline resin composed mainly of recurring units

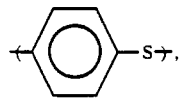

that is, (i) a resin composed solely of these recurring units or (ii) a resin comprising at least 80 mole %, especially at least 90 mole %, of these recurring units, is preferred in view of the physical properties such as heat resistance.

In the case where the resin is not composed solely of the above-mentioned recurring units, the remaining recurring units (for example, up to 20 mole %) may be, for example, the following recurring units:

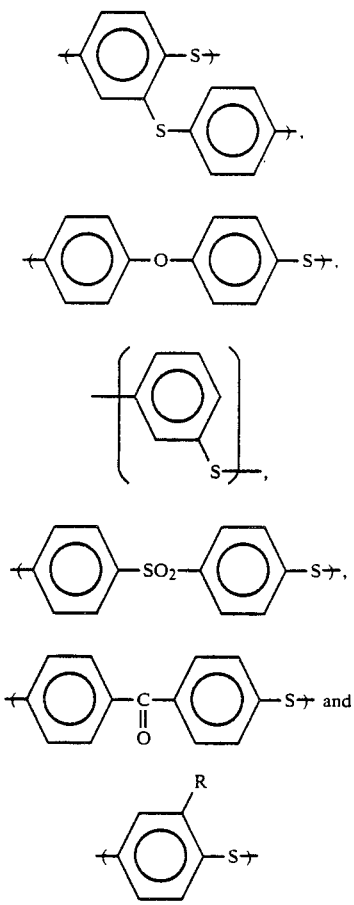

wherein R represents an alkyl group, preferably a lower alkyl group.

From the viewpoint of the physical properties of the molded article obtained, it is preferred that the polyphenylene sulfide used in the present invention should have a substantially linear structure. However, (i) a crosslinked polymer obtained by using at the polymerization an effective amount of a crosslinking agent (for example, a trihalobenzene) or (ii) a heat-crosslinked product obtained by effecting crosslinking in the presence of oxygen or the like can be used, so far as the physical properties are not substantially degraded.

Preferably, the polyphenylene sulfide resin used for the composition of the present invention has a melt viscosity at 300° C. of 100 to 20,000 poise (P), especially 500 to 10,000 P. If this melt viscosity is lower than 100 P, the flowability is too high and molding is difficult. If the melt viscosity is higher than 20,000 P, the flowability is too low and molding is difficult.

The polyphenylene sulfide resin used in the present invention can be prepared according to any suitable processes, so far the intended objects of the present invention can be attained. However, a preferred polyphenylene sulfide resin satisfying the above requirements can be prepared, for example, according to a process for preparing a polymer having a relatively low molecular weight, as disclosed in Japanese Examined Patent Publication No. 45-3368; a process for preparing a linear polymer having a relatively high molecular weight, as disclosed in Japanese Examined Patent Publication No. 52-12240; a process comprising heating a polymer having a low molecular weight in the presence of oxygen to obtain a crosslinked polymer; and modifications of these processes to which necessary changes are made.

When a fibrous filler is used, the polyphenylene sulfide resin can be treated with hot water or the like according to need.

(2) Crystalline resin composed mainly of 3-methyl 1-butene [component (b)]

The component (b) is a crystalline resin selected from the group consisting of homopolymers of 3-methyl 1-butene and crystalline random or block copolymers comprising at least 60 mole %, preferably at least 70 mole %, of 3-methyl-1-butene units. A mixture of two or more of the foregoing polymers can be used as the component (b).

In the case where a copolymer is used as the component (b), examples of the comonomer to be copolymerized with 3-methyl-1-butene include (a) linear and branched α-olefins having 2 to 12 carbon atoms, such as ethylene, propylene, 1-butene, 1-hexene, 1-octene, 1-decene, 4-methyl-1-pentene, 4,4-dimethyl-1-pentene, 3,5,5-trimethyl-1-hexene and styrene, (b) linear internal olefins such as 2-butene, 2-hexene and 2-octene (each of cis- and trans-isomers can be used), and (c) unconjugated dienes such as 1,4-hexadiene, methyl-1,4-hexadiene, 1,5-hexadiene and 2-methyl-1,7-octadiene. Especially preferred olefins include 1-butene, 1-octene, 4-methyl-1-pentene, 1,5-hexadiene and 2-methyl-1,7-octadiene are preferably used.

If the content of the comonomer in the component (b) is 40 mole % or higher, the melting point is lowered and the heat resistance of the intended thermoplastic resin is degraded. It is preferred that the melting point of the component (b) be 240° to 310° C., especially 260° to 310° C.

The melt flow rate determined by a method of ASTM 1238 at a temperature of 340° C. under a load of 2.16 kg of the component (b) is 0.01 to 5 g/10 min, preferably 0.05 to 3 g/10 min. If the melt flow rate of the component (b) is lower than 0.01 g/10 min, the moldability will be poor and if the melt flow rate is higher than 5 g/10 min, the mechanical strength will be lowered.

The crystallization degree of the component (b) is at least 10% but is lower than 70%, preferably at least 25% but lower than 60%. The crystallization degree referred to in the instant specification is one determined according to the method of X-ray diffraction analysis (Natta et al: Atti. Acad. Nazl. Lincei Rend., vol. 8(8) p 11 (1957)).

The poly-3-methyl-1-butene can be prepared according to known processes. The process disclosed in Japanese Unexamined Patent Publication No. 57-195704 is especially preferably adopted because the polymer can be prepared in a high yield.

In the case where it is necessary to use, for example, a fibrous filler, (i) an unsaturated carboxylic acid or an anhydride thereof such as maleic anhydride, or (ii) a silane compound having a vinyl group and an alkoxy group, preferably a lower alkoxy group, preferably the former (i), can be added, preferably in an amount of 0.1 to 10 parts by weight, to the component (b).

Furthermore, a 3-methyl-1-butene polymer grafted with these compounds can be added in an amount of 1 to 50 parts by weight to the untreated 3-methyl-1-butene polymer.

(3) Partially hydrogenated alkenyl aromatic compound-conjugated diene copolymer [component (c)]

The component (c) is a partially hydrogenated alkenyl aromatic compound-conjugated diene copolymer. This copolymer has a structure comprising at least one chain block (A) derived from the alkenyl aromatic compound and at least one chain (B) derived from the conjugated diene, and this block copolymer has at least the aliphatic unsaturated group of the block (B) of the copolymer decreased by hydrogenation. The arrangement of the blocks [A] and (B) is such as forming a linear structure represented by the following general formula:

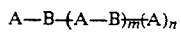

wherein m is 0 or a positive integer, n is 0 or 1, A represents a polymer block of the alkenyl aromatic compound, and B represents a polymer block of the conjugated diene,
or as forming a branched structure, namely a so-called radial teleblock structure. These structures can partially contain a random chain derived from the copolymer portion of the alkenyl aromatic compound and the conjugated diene. In the present invention, a copolymer having a linear structure is preferably used and a copolymer having a di-block structure is especially preferably used.

An alkenyl aromatic compound having an alkenyl group having 2 to about 6 carbon atoms, especially 2 to 4 carbon atoms, is preferably/used as the alkenyl aromatic compound forming the block (A). The number of benzene rings in this compound is at least 1 but up to about 4. Some of hydrogen atoms of the benzene ring can be substituted with a lower alkyl group having 1 to about 6 carbon atoms, preferably 1 to 4 carbon atoms, a hydroxyl group, a halogen atom or the like, preferably a lower alkyl group. Preferred examples of the alkenyl aromatic compound include styrene, α-methylstyrene, vinyltoluene and vinylnaphthalene. Styrene is most preferred.

As the conjugated diene compound forming the block (B), there can be mentioned linear and alicyclic compounds having about 4 to about 12 carbon atoms, preferably 4 to 8 carbon atoms, more preferably 4 to 6 carbon atoms, and derivatives thereof, such as lower alkyl-substituted derivatives.

The conjugated diene compound more preferably used in the present invention is butadiene. Moreover, isoprene, a mixture of butadiene and isoprene, and mixtures containing cyclopentadiene and derivatives thereof, and lower alkyl-substituted butadienes such as 2,3-dimethylbutadiene, in addition to butadiene and isoprene, are also preferable.

An olefinic hydrocarbon such as ethylene, propylene or 1-butene or an unconjugated diene can be comprised in the block (B), in addition to the above-mentioned diene component.

In the component (c), the proportion of the recurring units derived from the alkenyl aromatic compound in the partially hydrogenated alkenyl vinyl compound-conjugated diene block copolymer is preferably 20 to 80% by weight, more preferably 30 to 70% by weight, still more preferably 45 to 65% by weight. If the proportion of these recurring units is smaller than 20% by weight, the level of the rigidity of the composition is low, and if the proportion of these recurring units exceeds 80% by weight, the level of the impact resistance of the composition is low.

In the aliphatic chain portion in the partially hydrogenated alkenyl aromatic compound-conjugated diene block copolymer, the proportion of the unsaturated double bond derived from the conjugated diene and left in the non-hydrogenated state is smaller than 50 mole %, preferably smaller than 20 mole %, more preferably smaller than 10 mole %.

As regards the molecular weight of the hydrogenated block copolymer [component (c)], it is preferred that the viscosity of a toluene solution of the block copolymer at 25° C. be 5000 to 30 centipoise (cps) (the concentration is 15% by weight) or 20,000 to 50 cps (the concentration is 20% by weight). If the viscosity exceeds the upper level of this range, the moldability of the composition is impaired, and if the viscosity is below the lower level of the above-mentioned range, the mechanical strength is reduced.

Various processes for the preparation of alkenyl aromatic compound-conjugated diene block copolymers have been proposed. In the present invention,-an appropriate process is selected and used for the production of the copolymer. Typical processes are disclosed, for example, in Japanese Examined Patent Publication No. 40-23798, U.S. Pat. No. 3,595,942 and the U.S. Pat. No. 4,090,996.

In the present invention, examples of preferable processes include a process in which the block copolymerization is carried out in an inert solvent in the presence of a palladium catalyst, a lithium catalyst or a Ziegler catalyst.

The hydrogenation process of the block copolymer obtained is carried out in the presence of a hydrogenation catalyst in an inert solvent according to the process disclosed in Japanese Examined Patent Publication No. 42-8704, No. 43-6636 or No. 46-20814. According to this hydrogenation process, at least 50 mole %, preferably at least 80 mole %, of the olefinic double bond in the block (B) is hydrogenated. Furthermore, according to this process, up to about 25 mole % of the aromatic unsaturation in the block [A] is simultaneously hydrogenated.

(4) Fibrous filler [component (d)]

Examples of the fibrous filler include a glass fiber, a carbon fiber, a potassium titanate fiber, a rock wool fiber and a boron fiber. A glass fiber is preferably used in the present invention. The fiber length and fiber diameter of the fibrous filler can be appropriately decided according to the shape of the molded article to be produced and the molding method to be used. In general, a fibrous filler having a diameter of 2 to 15μ is used. A fibrous filler treated at its surface with a coupling agent such as, for example, a silane coupling agent, a chromium coupling agent or a titanium coupling agent, especially a silane coupling agent, is preferably used.

[II] Thermoplastic resin composition

The thermoplastic resin composition of the present invention will now be described.

(1) Components

Components other than the components (a) to (d) can be comprised in the thermoplastic resin composition of the present invention for modification thereof, so far as the intended objects of the present invention can be attained.

Accordingly, the thermoplastic resin composition of the present invention includes not only a composition comprising predetermined amounts of the foregoing components (a), (b), (c) and (d) alone, but also a composition comprising any suitable additional components in addition to the foregoing essential components (a), (b), (c) and (d).

Examples of such additives include (a) homopolymer and mutual copolymer resins of α-olefins such as ethylene, propylene, butene-1, pentene-1 and 4-methyl-1-pentene; (b) modification products of these olefin polymers, namely polymers treated with an unsaturated organic acid or a derivative thereof, and polymers modified by graft copolymerization, chlorination, sulfonation, styrenation or oxidation; (c) copolymers of an α-olefin with a comonomer other than an α-olefin such as an unsaturated organic acid or a derivative thereof, a vinyl ester, an unsaturated organic silane compound or the like; (d) modification products of these copolymers including a saponified ethylene/vinyl acetate copolymer; (e) resins such as polystyrene, an acrylonitrile-butadiene-styrene copolymer resin (ABS), a polyamide, a polyester, a polyphenylene ether, a polycarbonate and polyvinyl chloride; and (f) rubber components such as an ethylene-propylene rubber (including EPDM), an ethylene-1-butene rubber including a terpolymer rubber further copolymerized with a polyene, a natural rubber, a polybutadiene rubber, a polyisoprene rubber, a styrene-butadiene rubber (SBR) and a butyl rubber.

Furthermore, according to need, there can be added (g) phenolic, sulfurized, phosphoric or aminated stabilizers such as antioxidants, heat stabilizers, ultraviolet absorbers or antistatic agents, (h) inorganic fillers such as silica, mica, talc, calcium carbonate, carbon black, glass microsphere, gypsum, clay, aluminum hydroxide, magnesium hydroxide and titanium oxide, (i) colorants and pigments, (j) flame retardants, (k) surface active agents and (l) crosslinking inhibitors or crosslinking retardants.

(2) Proportion of components

The weight ratio between the component (a) and component (b) is from 10/90 t 95/5, preferably from 15/85 to 90/10, more preferably from 20/80 to 80/20. If the amount of the component (a) is smaller than 10% by weight, the effect of improving the rigidity at a high temperature is insufficient, and if the amount of the component (a) is larger than 95% by weight, the effect of improving the moldability is insufficient. If the amount of the component (a) is 20 to 40% by weight (hence, the amount of the component (b) is 80 to 60% by weight), the rigidity at normal temperature is specifically improved, though the reason has not been elucidated yet.

The amount of the component (c) is 5 to 20 parts by weight, preferably 7 to 15 parts by weight, more preferably 8 to 12 parts by weight, per 100 parts by weight of the sum of the components (a) and (b). If the amount of the component (c) is smaller than 5 parts by weight, the effect of improving the impact resistance is insufficient, and if the amount of the component (c) is larger than 20 parts by weight, the rigidity and heat resistance are degraded.

The amount of the component (d) is 0 to 150 parts by weight, preferably 0 to 100 parts by weight, per 100 parts by weight of the sum of the components (a) and (b). If the amount of the component (d) exceeds 150 parts by weight, the flowability is impaired at the molding step.

(3) Preparation of thermoplastic resin composition

A kneading method customarily practiced for thermoplastic resins can be adopted for obtaining the thermoplastic resin composition of the present invention. For example, the powdery or granular components are uniformly mixed, if necessary together with the above-mentioned additives (a) through (1), by a Henschel mixer, a ribbon blender or a twin-cylinder mixer, and the mixture is kneaded by a single-screw or multi-screw kneading extruder, a roll or a Banbury mixer. When a multi-screw kneading extruder is used, a composition having high physical properties can be obtained at a high efficiency.

The kneading temperature is 300° to 340° C., preferably 310° to 340° C.

If the kneading temperature is outside the above-mentioned range, a composition having high physical properties may not be obtained. It is considered that the reason is that an appropriate melt viscosity may not be attained.

The components (a), (b), (c) and (d) and, if necessary, other adjuvants, can be simultaneously melt-kneaded in the above-mentioned apparatus. Under certain circumstances, there can be adopted a method in which some components of the constituent components of the present invention are melt-kneaded in advance, and the remaining components are then added and the mixture is melt-kneaded. It is especially preferred that the component (d) be added after the components (a), (b) and (c) have been melt-kneaded.

If necessary, the melt-kneaded composition can be granulated by using a granulator or a pulverizing machine.

(4) Molding of thermoplastic resin

In the present invention, the process for molding/forming the thermoplastic resin composition is not particularly critical. Molding processes heretofore generally adopted for thermoplastic resins, such as injection molding, blow molding, extrusion molding, sheet forming, heat forming, rotational molding, lamination molding and stamping, can be adopted. Of these molding/forming processes, the injection molding process is most preferably adopted.

[III] Examples

The present invention and the effects attained by the present invention will now be described in detail with reference to the following examples.

Samples of the respective components used in the examples were as follows.

(1) Polyphenylene sulfide resin [component (a)]

Tohpren T-4 supplied by Tohpren Co. (the melt viscosity is about 3000 P at 300° C.) was used.

Incidentally, in Example 5, a product formed by treating this polymer with hot water at 100° C. for 1 hour and drying the polymer treated was used.

(2) 3-Methyl-1-butene homopolymer [component (b)]

The inner atmosphere of a stainless steel reaction vessel equipped with stirring blades and an inner capacity of 10 liters was sufficiently replaced by nitrogen, and 2.0 kg of 3-methyl-1-butene was charged in the reaction vessel and then, 6.3 g of an organoaluminum compound having an average composition represented by the general formula of $Et_{2.5}Al(OEt)_{0.5}$ (in which Et represents an ethyl group) and 3.5 g of titanium trichloride (TOL 18 supplied by Marubeni-Solvay Co.) were further charged in the reaction vessel. Then, the inner temperature of the reaction vessel was elevated to 90° C. Then, the reaction mixture was stirred at 90° C. for 6 hours while 1.0 kg of 3-methyl-1-butene was supplied at a rate of 0.25 kg/hr, whereby homopolymerization of 3-methyl-1-butene was conducted.

The polymer obtained was stirred at 80° C. for 2 hours in 3.5 lit. of n-heptane and 0.4 lit. of n-butanol to effect removal of the catalyst. Then, the polymer cake was recovered by filtration and was dried under reduced pressure to obtain a granular polymer. The crystallization degree of the obtained polymer was 68.5%.

(3) 3-Methyl-1-butene/4-methyl-1-pentene random copolymer [component (b)]

A random copolymer was prepared in the same manner as described in (2) above except that 1.65 kg of a mixture of 3-methyl-1-butene with 4-methyl-1-pentene at a weight ratio of 1/0.65 was supplied at a rate of 0.41 kg/hr instead of 1.0 kg of 3-methyl-1-butene supplied at a rate of 0.25 kg/hr. The crystallization degree of the polymer obtained was 54.0%.

(4) Modified 3-methyl-1-butene polymer [component (b)]

By a Henschel mixer, 100 parts by weight of the homopolymer obtained in (2) above was dry-blended with 3 parts by weight of maleic anhydride, and 0.1 part by weight of Perhexine 2.5B (supplied by Nippon Yushi Co., Japan) was further added to the dry blend. Then, the mixture was kneaded at 320° C. by using a twin-screw kneading machine having a screw diameter of 30 mm (supplied by Ikegai Tekko Co., Japan). When the composition obtained was subjected to extraction with acetone, it was found that the content of residual maleic anhydride was $1.4 \times 10^{-2}$ mole/100 g.

(5) Partially hydrogenated alkenyl aromatic compound-conjugated diene block copolymer [component (c)]

A non-hydrogenated styrene-butadiene block copolymer having a styrene content of 59% by weight (TR-2400 supplied by Nippon Synthetic Rubber Co., Japan) was hydrogenated at 150° C. under a hydrogen pressure of 50 kg/cm² in the presence of a palladium catalyst supported on alumina in methylcyclohexane as the solvent to obtain a hydrogenated block copolymer in which at least 95% of the double bonds derived from the conjugated diene was hydrogenated.

(6) Fibrous filler [component (d)]

A glass fiber (MAFT 591 supplied by Asahi Fiber Glass Co., Japan) was used as the fibrous filler.

(7) Polypropylene

A propylene-ethylene copolymer (BC5D supplied by Mitsubishi Petrochemical Co., Japan) was used.

EXAMPLES 1 THROUGH 4 AND COMPARATIVE EXAMPLES 1 THROUGH 3

(1) Preparation of Samples

According to the recipe shown in Table 1, components (a), (b) and (c) were dry-blended in a total amount of about 800 g, and 0.05 part by weight of 9,10-dihydroanthracene, 0.4 part by weight of Irgaphos P-EPQ and 0.1 part by weight of Irganox 1010 were incorporated in the dry blend. The mixture was preliminarily kneaded at a temperature of 330° C. and a rotor rotation of 20 rpm for 2 minutes by a multi-screw kneading machine (EK-2X-1000 supplied by Tosoku Seimitsu Kogyo Co., Japan), and if necessary, a glass fiber (MAFT 591 supplied by Asahi Fiber Glass Co., Japan) was added to the mixture. Then, the rotor rotation was elevated to 100 rpm and the mixture was further kneaded for 5 minutes. Prior to the kneading, the pressure in the kneading machine was reduced to a level lower than 10 Torr and nitrogen gas was introduced into the kneading machine to effect complete substitution with nitrogen.

After completion of the kneading, the kneading composition was pulverized by a pulverizing machine to obtain a granular product.

(2) Evaluation

The granular sample obtained was molded into test pieces by an injection molding machine (Model M40A-SJ supplied by Meiki Seisakusho Co.). The evaluation results are shown in Table 1.

TABLE 1

|  | Example No. | | | | Comparative Example No. | | |
| --- | --- | --- | --- | --- | --- | --- | --- |
|  | 1 | 2 | 3 | 4 | 1 | 2 | 3 |
| Composition (parts by weight) | | | | | | | |
| Polyphenylene sulfide resin | 30 | 75 | 40 | 30 | 75 | 30 | 100 |
| 3-Methyl-1-butene homopolymer | 70 | 25 | 0 | 0 | 0 | 70 | 0 |
| 3-Methyl-1-butene/4-methyl-1-pentene copolymer | 0 | 0 | 60 | 70 | 0 | 0 | 0 |
| Modified 3-methyl-1-butene homopolymer | 0 | 0 | 0 | 15 | 0 | 0 | 0 |
| Hydrogenated alkenyl aromatic compound-conjugated diene block copolymer | 8 | 10 | 8 | 12 | 8 | 0 | 0 |
| Fibrous filler | 0 | 0 | 0 | 40 | 0 | 0 | 0 |
| Polypropylene | 0 | 0 | 0 | 0 | 25 | 0 | 0 |
| Evaluation Results | | | | | | | |
| Three-point modulus of elasticity (23° C., kg/cm²) × 10³ | 35 | 33 | 29 | 98 | 21 | 37 | 35 |
| Three-point modulus of elasticity | 18 | 19 | 11 | 89 | 9 | 21 | 30 |

TABLE 1-continued

|  | Example No. | | | | Comparative Example No. | | |
| --- | --- | --- | --- | --- | --- | --- | --- |
|  | 1 | 2 | 3 | 4 | 1 | 2 | 3 |
| (60° C., kg/cm²) × 10³ | | | | | | | |
| Izod impact strength (23° C., kg · cm/cm²) | 6.1 | 5.6 | 7.0 | 9.9 | 6.9 | 3.1 | 1.8 |
| Heat distortion temperature (18.6 kg/cm², °C.) | 90 | 102 | 88 | 258 | 78 | 91 | 108 |
| Appearance of molded article | ◯ | ◯ | ◯ | ◯ | ◯ | ◯ | Δ |

Note:
Evaluation Methods
(1) Modulus of elasticity
The modulus of elasticity was measured at 23° C. and 60° C. by using an Instron tester according to Procedure 12 of ISO R178-1974 (JIS K-7203).
(2) Izod impact strength
The Izod impact strength was measured at 23° C. by using an Izod impact tester supplied by Toyo Seiki Seisakusho Co. according to the notched impact test method of ISO R180-1969 (JIS K-7110).
(3) Heat distortion temperature
The heat distortion temperature was measured under a load of 18.6 kg/cm² according to the test method of ASTM D648.
(4) Appearance of molded article
The appearance of the molded article having a size of 65 mm × 65 mm × 2 mm was evaluated, and the sample which was practically satisfactory was designated by mark "◯" and the sample for which an improvement was required was designated by mark "Δ".

What is claimed is:

1. A thermoplastic resin composition formed by melt-kneading at a temperature of 300° to 340° C. a composition comprising
   (a) 10 to 95% by weight of a crystalline polyphenylene sulfide resin composed of at least 80 mole % of recurring phenylene sulfide units;
   (b) 90 to 5% by weight of a crystalline resin which comprises 60 to 100 mole % of 3-methyl-1-butene and has a crystallization degree of 10 to 70%, each amount of the components (a) and (b) being based on the sum of the components (a) and (b);
   (c) 5 to 10 parts by weight per 100 parts by weight of the sum of the components (a) and (b) of an alkenyl aromatic compound-conjugated diene block copolymer, comprising a polymer block (A) of a lower alkenylphenyl or a lower alkenyl(lower alkyl-substituted phenyl) compound and a polymer block (B) of a conjugated diene compound having 4 to 8 carbon atoms and having a polymer block (B) content of 80 to 20% by weight, in which at least 50% of the unsaturated double bond derived from the conjugated diene is hydrogenated; and
   (d) 0 to 150 parts by weight per 100 parts by weight of the sum of components (a) and (b) of a fibrous filler.

2. A composition as set forth in claim 1, wherein the polyphenylene sulfide resin as the component (a) comprises at least 90 mole % of units of

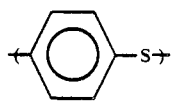

and has a melt viscosity of 100 to 20,000 P as measured at 300° C.

3. A composition as set forth in claim 2, wherein the melt viscosity is 500 to 10,000.

4. The composition as set forth in claim 1, wherein the crystalline resin of component (b) is selected from the group consisting of
   (A) a polymer obtained by graft-copolymerizing a crystalline resin comprised of 60 to 100 mole % of 3-methyl-1-butene with an unsaturated compound selected from the group consisting of (i) an unsaturated carboxylic acid or an anhydride thereof and (ii) a silane compound having a vinyl group and a lower alkoxy group, and
   (B) a mixture of a crystalline resin comprised of 60 to 100 mole % of 3-methyl-1-butene and said graft copolymer (A).

5. A composition as set forth in claim 1, wherein the viscosity of a toluene solution of the partially hydrogenated alkenyl aromatic compound-conjugated diene copolymer having a concentration of 15% by weight at 25° C. is 5000 to 30 cps.

6. A composition as set forth in claim 1, wherein the component (a)/component (b) weight ratio is in the range of from 15/85 to 90/10.

7. A composition as set forth in claim 1, wherein the component (a)/component (b) weight ratio is in the range of from 20/80 to 80/20.

8. A composition as set forth in claim 1, wherein the component (a)/component (b) weight ratio is in the range of from 20/80 to 40/60.

9. A composition as set forth in claim 1, wherein the weight ratio of the component (c) to the sum of the components (a) and (b) is in the range of from 5/100 to 20/100.

10. The composition set forth in claim 1, wherein the crystalline resin of component (B) comprises at last 70 mole % of 3-methyl-1-butene units and the crystallization degree is at least 25% but lower than 60%.

11. The composition set forth in claim 1, wherein the unsaturated double bond derived from the conjugated diene of the alkenyl aromatic compound-conjugated diene block copolymer is at least 90% hydrogenated.

12. The composition set forth in claim 4, wherein the silane compound is a vinylalkoxysilane.

* * * * *